US012388170B2

(12) United States Patent
Huang

(10) Patent No.: US 12,388,170 B2
(45) Date of Patent: Aug. 12, 2025

(54) ANTENNA MODULE AND WIRELESS COMMUNICATION DEVICE HAVING SAME

(71) Applicant: Chiun Mai Communication Systems, Inc., New Taipei (TW)

(72) Inventor: Chang-Ching Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 193 days.

(21) Appl. No.: 18/215,983

(22) Filed: Jun. 29, 2023

(65) Prior Publication Data

US 2024/0291139 A1 Aug. 29, 2024

(30) Foreign Application Priority Data

Feb. 24, 2023 (CN) ......................... 202310208944.7

(51) Int. Cl.

| | |
|---|---|
| ***H01Q 1/32*** | (2006.01) |
| ***H01Q 1/42*** | (2006.01) |
| ***H01Q 21/28*** | (2006.01) |
| ***H01Q 23/00*** | (2006.01) |

(52) U.S. Cl.

CPC ............. *H01Q 1/3275* (2013.01); *H01Q 1/42* (2013.01); *H01Q 21/28* (2013.01); *H01Q 23/00* (2013.01)

(58) Field of Classification Search

CPC .......... H01Q 1/22; H01Q 1/32; H01Q 1/3275; H01Q 1/36; H01Q 1/362; H01Q 1/42; H01Q 1/50; H01Q 5/35; H01Q 5/371; H01Q 5/40; H01Q 9/40; H01Q 21/28; H01Q 23/00

See application file for complete search history.

(56) References Cited

U.S. PATENT DOCUMENTS

| | | | |
|---|---|---|---|
| 2016/0064807 A1 | 3/2016 | Reed et al. | |
| 2022/0384939 A1 | 12/2022 | Terashita et al. | |

FOREIGN PATENT DOCUMENTS

| | | | | |
|---|---|---|---|---|
| CN | 206673094 U | 11/2017 | | |
| CN | 112397878 A | 2/2021 | | |
| KR | 1718919 B1 * | 3/2017 | ........... | H01Q 1/3275 |
| KR | 20170003986 U | 11/2017 | | |

* cited by examiner

*Primary Examiner* — Hoang V Nguyen

(74) *Attorney, Agent, or Firm* — ScienBiziP, P.C.

(57) ABSTRACT

An antenna module and a wireless communication device are provided, the antenna module includes a first circuit board, a second first circuit board, a radiation cover, a first radiating portion, and a second radiating portion. The radiation cover covers one part of an end of the first circuit board and one part of two opposite surfaces of the first circuit board. The first radiating portion is arranged on the first circuit board and perpendicular to the second circuit board, the first radiating portion receives wireless radiation signals in a first frequency band through the radiation cover. The second radiating portion is arranged on the first circuit board and includes a first radiating section and a second radiating section connected to the first radiating section in a predetermined angle, the second radiating portion receives wireless radiation signals in a second frequency band through the radiation cover.

18 Claims, 16 Drawing Sheets

ANTENNA MODULE AND WIRELESS COMMUNICATION DEVICE HAVING SAME

CROSS-REFERENCE TO RELATED APPLICATIONS

This application claims priority to Chinese Patent Application No. 202310208944.7 filed on Feb. 24, 2023, in China National Intellectual Property Administration, the contents of which are incorporated by reference herein.

FIELD

The subject matter herein generally relates to wireless communication, and more particularly to an antenna module of a wireless communication device having the antenna module.

BACKGROUND

Antennas, such as shark fin antennas, are mounted to vehicles, such as automobiles, and severed as car antennas, which may operate wireless communication signals of a high frequency band, such as above 500 MHz. However, when the shark fin antennas operate wireless communication signals of low frequency bands, such as FM frequency band of 88-108 MHz and DAB frequency band of 178-238 MHz, due to a long wave length, vehicle mounted antennas are usually pull-rod antennas. Additionally, the shark fin antennas need to be adapted to an entire vehicle design and meet structural strength requirements, adapting to the vehicle design and ensuring adequate antenna performances are challenging.

BRIEF DESCRIPTION OF THE DRAWINGS

Implementations of the present disclosure will now be described, by way of embodiments, with reference to the attached figures.

DETAILED DESCRIPTION

Figure 1:
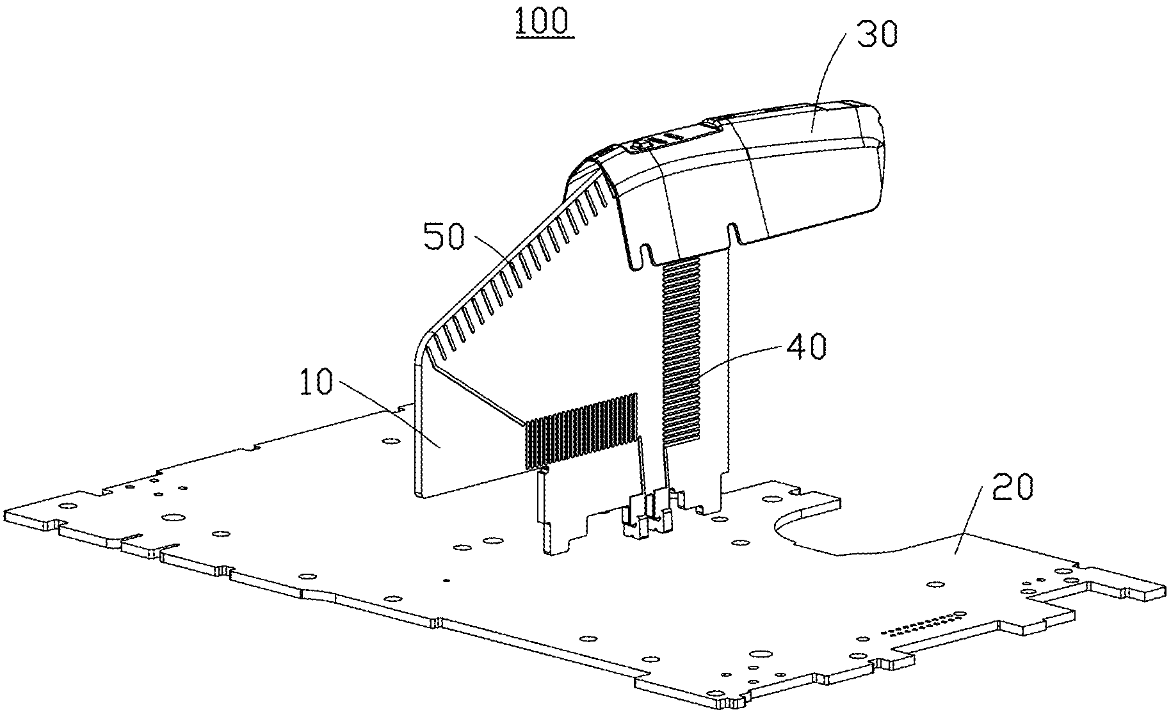
FIG. 1 is a schematic diagram of an antenna module according to a first embodiment of the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows at least one embodiment of an antenna module 100 that can be applied to a wireless communication device, such as a vehicle with wireless communication function, for transmitting and receiving radio waves for transmitting and exchanging wireless signals. The vehicle may be an automobile. The antenna module 100 may be a shark fin antenna.

Figure 2:
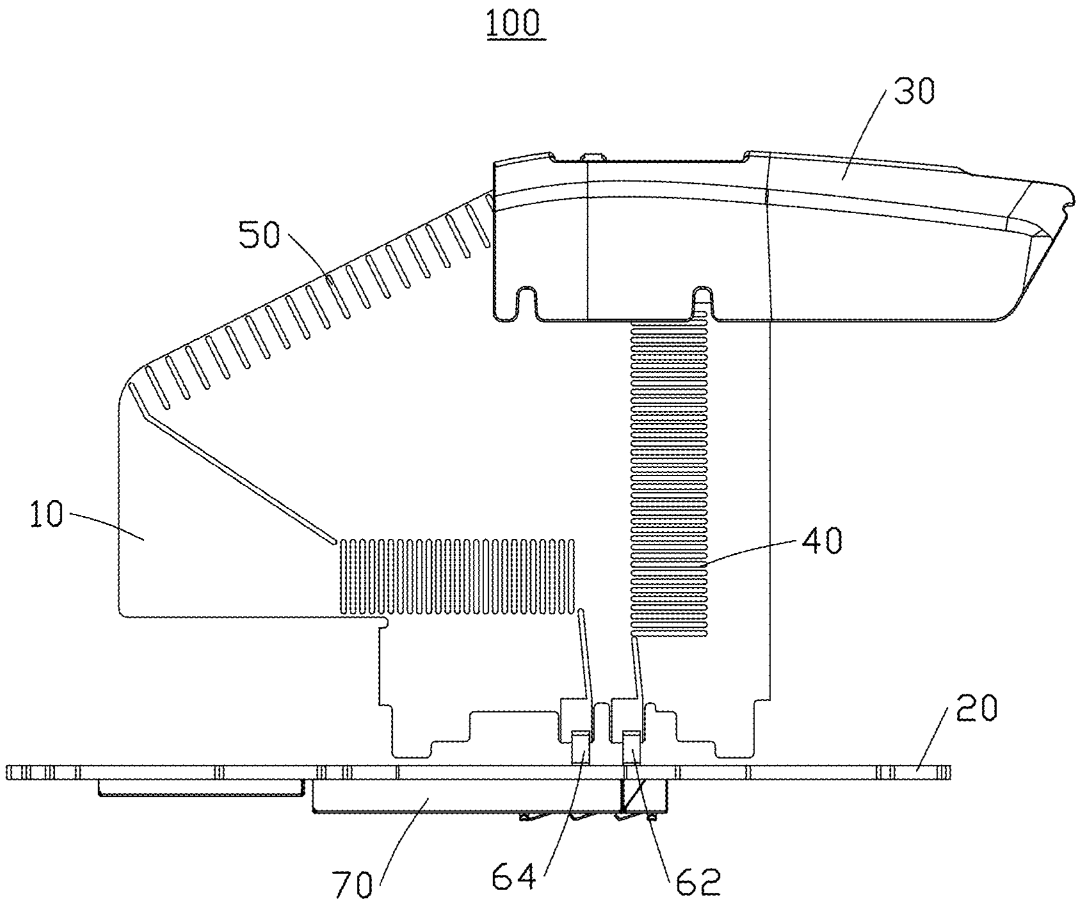
FIG. 2 is a cross-sectional diagram of the antenna module of FIG. 1.
Figure 3:
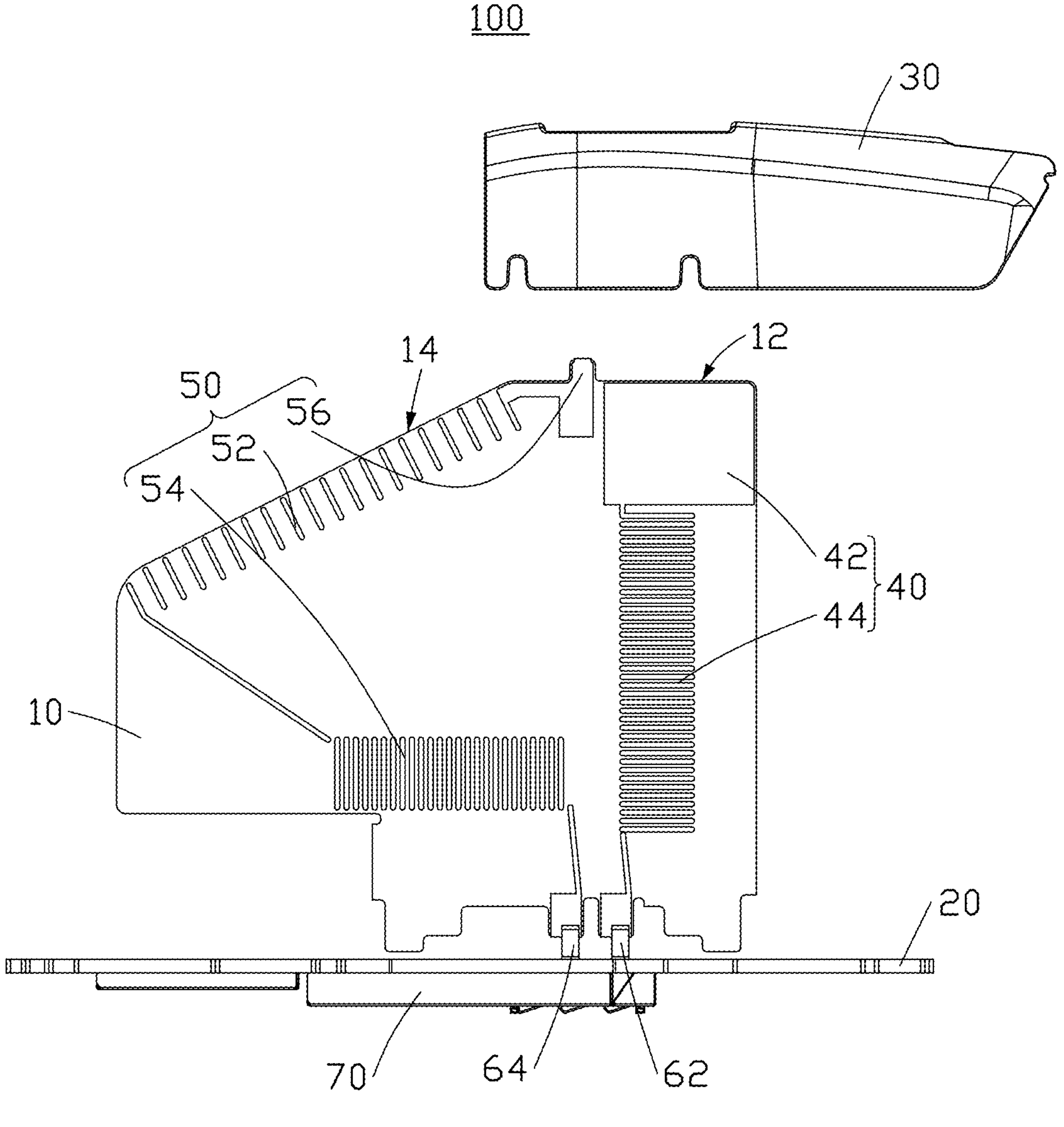
FIG. 3 is an explored cross-sectional diagram of the antenna module of FIG. 1.

Referring to FIGS. 1-3, the antenna module 100 includes a first circuit board 10, a second circuit board 20, a radiation cover 30, a first radiating portion 40, a second radiating portion 50, a first feed point 62, a second feed point 64, and a low noise amplifier (LNA) circuit 70.

A surface of the first circuit board 10 is perpendicular to a surface of the second circuit board 20. In at least one embodiment, the second circuit board 20 may be arranged inside the vehicle, such as a plane of a ceiling of the vehicle; the first circuit board 10 may be arranged on the top of the vehicle for broadly receiving wireless signals.

The first circuit board 10 may be a carrier of the radiation cover 30, the first radiating portion 40, and the second radiating portion 50. The first circuit board 10 at least includes a top side 12 and a bevel side 14. The top side 12 is a side of the first circuit board 10 that away from the second circuit board 20. The top side 12 is parallel with the second circuit board 20. The bevel side 14 and the top side 12 are connected with a predetermined angle. Thus, the bevel side 14 and the second circuit board 20 are also in the predetermined angle.

The first radiating portion 40 is arranged on the first circuit board 10 and perpendicular to the second circuit board 20. In one embodiment, the first radiating portion 40 can be arranged on at least one surface of the first circuit board 10. In another embodiment, the first radiating portion 40 can be arranged throughout the first circuit board 10 and arranged on two opposite surfaces of the first circuit board 10. In another embodiment, the first radiating portion 40 can be respectively arranged on two opposite surfaces of the first circuit board 10.

The second radiating portion 50 is arranged on the first circuit board 10. The second radiating portion 50 includes a first radiating section 52, a second radiating section 54, and a connecting portion 56. The first radiating section 52 and the second radiating section 54 are connected to the connected in a predetermined angle. In one embodiment, the first radiating section 52, the second radiating section 54, and the connecting portion 56 can be arranged on at least one surface of the first circuit board 10. In another embodiment, the first radiating section 52, the second radiating section 54, and the connecting portion 56 can be arranged on two opposite surfaces of the first circuit board 10.

In at least one embodiment, the first radiating section 52 and the second radiating section 54 are in coil shaped. Two opposite ends of the first radiating section 52 are connected to the second radiating section 54 and the connecting portion 56, respectively. The first radiating section 52 is arranged along the bevel side 14 of the first circuit board 10, so the first radiating section 52 and the second circuit board 20 are in a predetermined angle. The second radiating section 54 is parallel with the second circuit board 20, opposite ends of the second radiating section 54 are connected to the first radiating section 52 and the second feed point 64, respectively. The connecting portion 56 is arranged along the top side 12 of the first circuit board 10, the connecting portion 56 extends through and out of the top side 12, for securing the radiation cover 30 to the first circuit board 10.

The first radiating portion 40 includes a third radiating section 42 and a fourth radiating section 44 connected to each other. In at least one embodiment, the third radiating section 42 is substantially rectangular, the fourth radiating section 44 is in coil shaped. The third radiating section 42 is arranged along the top side 12 of the first circuit board 10, and spaced apart from the connecting portion 56, so the third radiating section 42 and the connecting portion 56 can form signal or electric current coupling effect. The fourth radiating section 44 is substantially perpendicular to the second circuit board 20, opposite ends of the fourth radiating section 44 are connected to the third radiating section 42 and the first feed point 62, the fourth radiating section 44 is spaced apart from the second radiating section 54. The fourth radiating section 44 is mainly configured to adjust a resonance frequency of the first radiating portion 40. In one embodiment, the third radiating section 42 and the fourth radiating section 44 can be arranged on at least one surface of the first circuit board 10. In another embodiment, the third radiating section 42 and the fourth radiating section 44 can be arranged on two opposite surfaces of the first circuit board 10.

Figure 4:
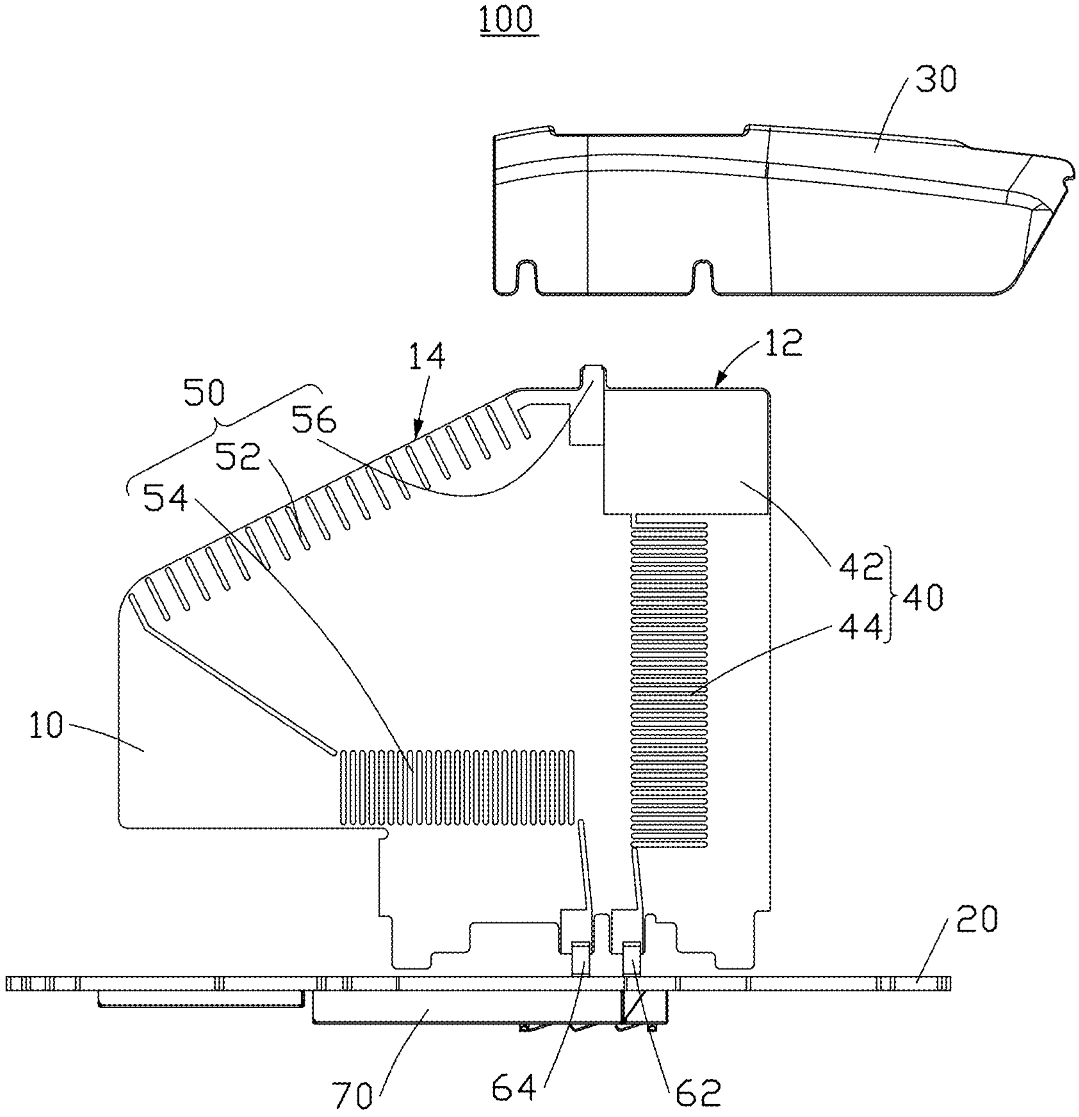
FIG. 4 is an explored cross-sectional diagram of the antenna module according to another embodiment of the present application.

Referring to FIG. 4, in another embodiment, the third radiating section 42 and the connecting portion 56 are connected, so the third radiating section 42 and the connecting portion 56 can form signal or electric current conduct effect.

Figure 7:
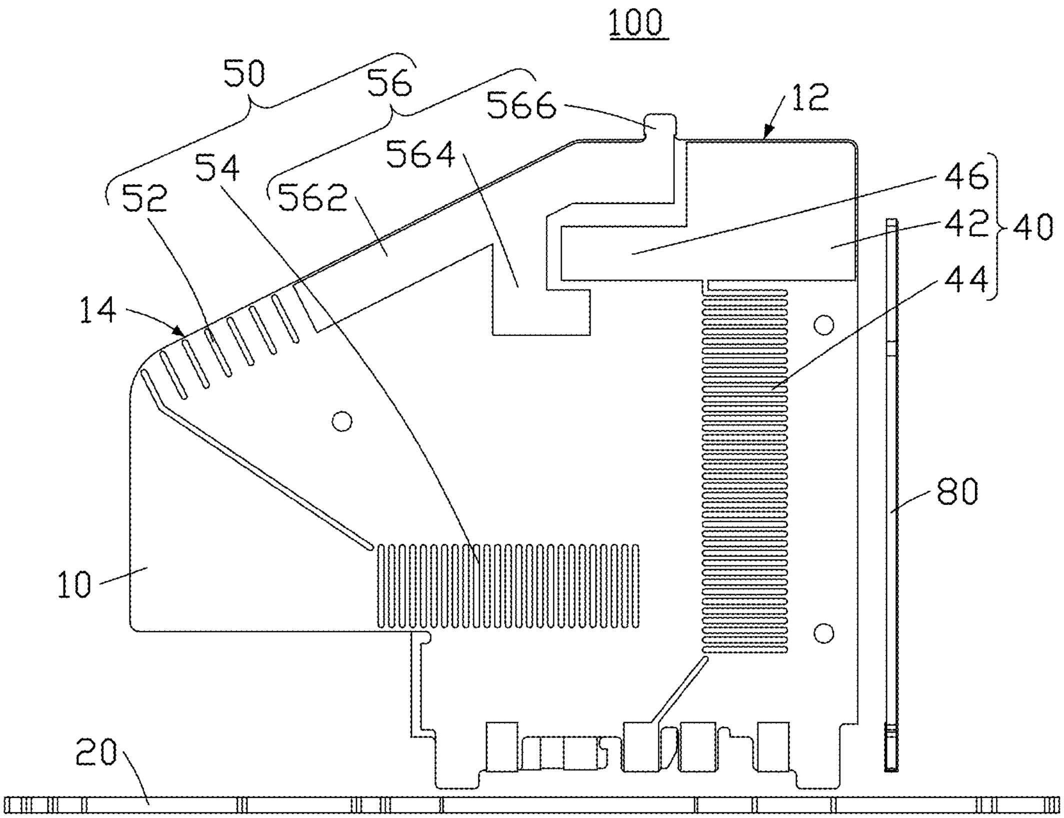
FIG. 7 is a plane diagram of a first circuit board of the antenna module of FIG. 5.

Referring to FIG. 7, in another embodiment, the third radiating section 42 further includes an extending arm 46. The extending arm 46 is extended from a side of the third radiating section 42 away from the top side 12 along a direction parallel with the top side 12, and extended towards the connecting portion 56. The connecting portion 56 includes a first arm 562, a second arm 564, and a protruding portion 566. The first arm 562 is arranged along the top side 12 and the bevel side 14, the first arm 562 is connected to the first radiating section 52. Comparing to the embodiment shown in FIG. 3, the part of the first arm 562 arranged along the bevel side 14 is replaced by the first radiating section 52 to decrease the length of the first radiating section 52. The second arm 564 is substantially L-shaped, the second arm 564 is extended from a substantially middle portion of the first arm 562 towards the second circuit board 20 and bent, and then extended towards the fourth radiating section 44. The protruding portion 566 is protruded from the top side 12. The third radiating section 42 and the extending arm 46 are largely spaced apart from the first arm 562 and the second arm 564, which forming a greater coupling area to increase the coupling effect and an impedance matching.

In at least one embodiment, the first radiating section 52, the second radiating section 54, the third radiating section 42, and the fourth radiating section 44 may be formed on a surface of the first circuit board 10 by printing. The printing may include a Laser-Direct-structuring (LDS) technology, etc.

The radiation cover 30 at least covers one part of an end of the first circuit board 10. In detail, the radiation cover 30 at least covers the top side 12 of the first circuit board 10, and at least partially protrudes from a side of the first circuit board 10 away from the bevel side 14. As shown in FIG. 2, one part of the radiation cover 30 covers the end of the first circuit board 10 and two surfaces of the first circuit board 10. In addition, another part of the radiation cover 30 does not cover the first circuit board 10 (right part of the radiation cover 30 as shown in FIG. 2). The connecting portion 56 has a protrusion structure protruding from the top side 12 and secured through the radiation cover 30, so the radiation cover 30 is secured to the first circuit board 10, the second radiating portion 50 and the radiation cover 30 can conduct signal or electric current through the connecting portion 56. The radiation cover 30 covers the third radiating section 42, but spaced apart from the third radiating section 42, so the third radiating section 42 and the radiation cover 30 can conduct signal or electric current.

In another embodiment, the connecting portion 56 and the top side 12 may be both connected to the radiation cover 30, so the radiation cover 30 is secured to the first circuit board 10, the second radiating portion 50 and the radiation cover 30 can conduct signal or electric current through the connecting portion 56, the first radiating portion 40 and the radiation cover 30 can conduct signal or electric current through the third radiating section 42.

The first feed point 62 and the second feed point 64 are arranged on a side of the first circuit board 10 away from the top side 12 at interval. The first feed point 62 and the second feed point 64 are configured to feed electric current into the first radiating portion 40 and the second radiating portion 50.

The second circuit board 20 arranges with an electric current feed source, a ground plane, and system circuits. The electric current feed source is configured to provide electric current for the antenna module 100. The ground plane is configured to provide grounding for the antenna module 100. The system circuits are configured to execute system functions of the antenna module 100, such as receiving and processing wireless communication signals.

The LNA circuit 70 is arranged on a surface of the second circuit board 20 that away from the first circuit board 10. The LNA circuit 70 is electrically connected between the electric current feed source and each of the first feed point 62 and the second feed point 64. The LNA circuit 70 may be configured to decrease noise of the wireless signals received by the antenna module 100, to improve a signal to noise ratio (SNR) and provide a good signal quality.

Figure 5:
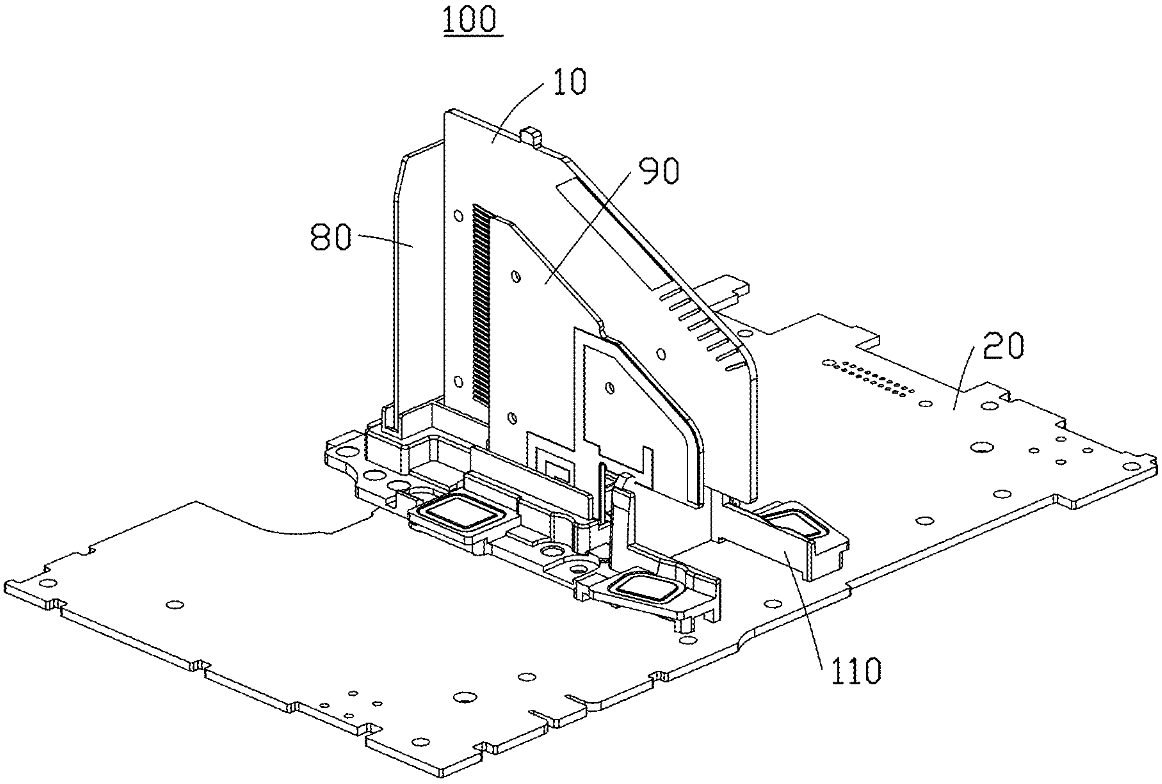
FIG. 5 is a schematic diagram of the antenna module according to another embodiment of the present application.
Figure 6:
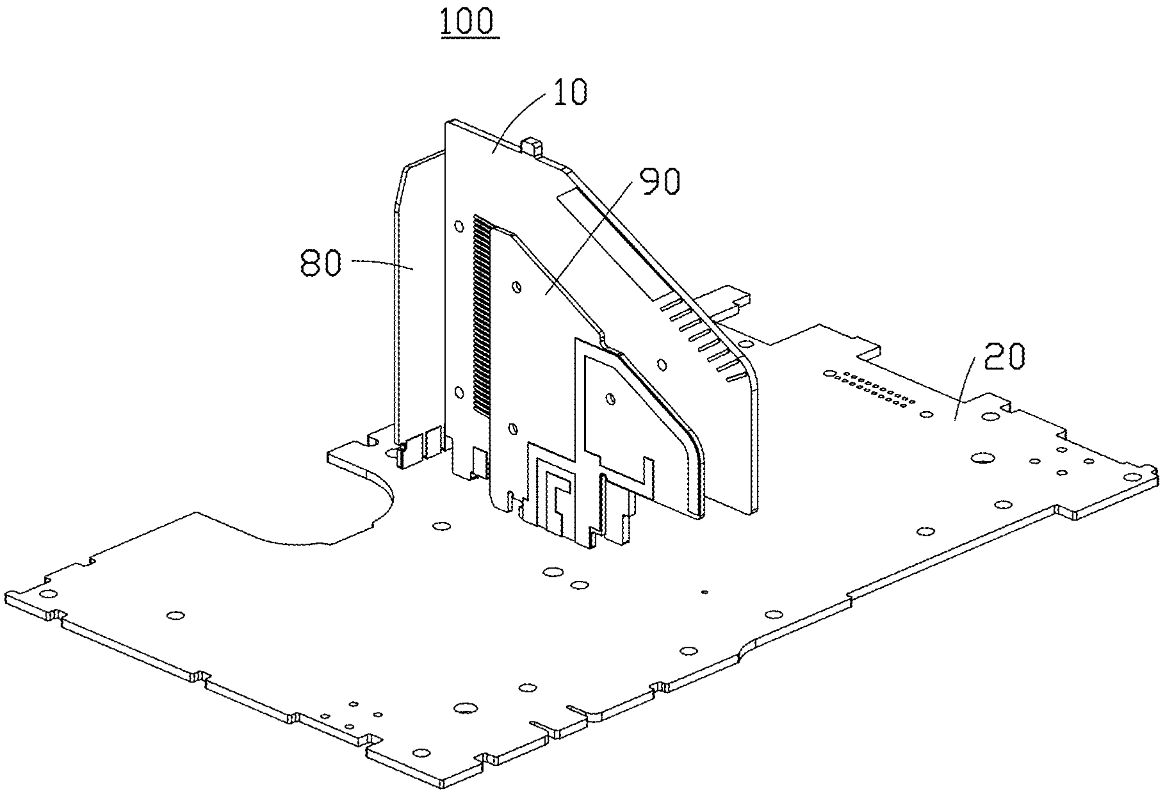
FIG. 6 is another schematic diagram of the antenna module of FIG. 5.

Referring to FIGS. 5 and 6, in at least one embodiment, the antenna module 100 may further include a third circuit board 80 and a fourth circuit board 90. A surface of the third circuit board 80, the surface of the second circuit board 20, and the surface of the first circuit board 10 are perpendicular to each other. A surface of the fourth circuit board 90 is parallel with the surface of the first circuit board 10, the surface of the fourth circuit board 90, the surface of the third circuit board 80, and the surface of the second circuit board 20 are perpendicular to each other.

Figure 8:
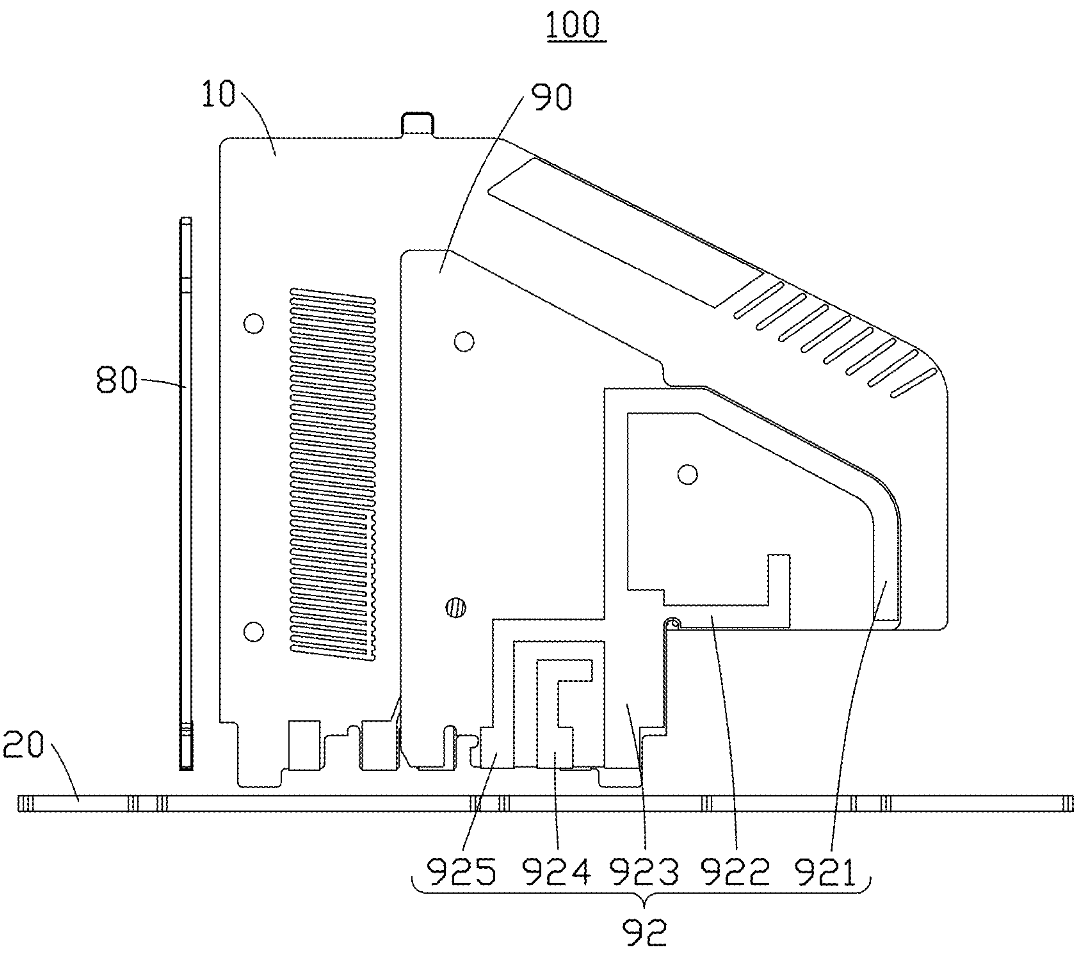
FIG. 8 is a plane diagram of a second circuit board of the antenna module of FIG. 5.

Referring to FIG. 8, the fourth circuit board 90 arranges with a vice radiator 92 of a 4G antenna. The vice radiator 92 includes a first radiating arm 921, a second radiating arm 922, a feed arm 923, a first ground arm 924, and a second ground arm 925. The feed arm 923, the first ground arm 924, and the second ground arm 925 are arranged at intervals.

One end of the feed arm 923 is electrically connected to the electric current feed source of the second circuit board 20 for feeding electric current. The first ground arm 924 is substantially L-shaped and arranged between the feed arm 923 and the second ground arm 925 at intervals. One end of the first ground arm 924 is grounded, another end of the first ground arm 924 is a free end. The second ground arm 925 is substantially L-shaped, one end of the second ground arm 925 is grounded, another end of the second ground arm 925 is connected to the feed arm 923. The first radiating arm 921 is extended along the feed arm 923 and then bent, the first radiating arm 921 is substantially U-shaped. The second radiating arm 922 is substantially L-shaped, one end of the second radiating arm 922 is substantially perpendicular to the feed arm 923, another end of the second radiating arm 922 is spaced apart from the first radiating arm 921.

The feed arm 923 supplies electric current, the electric current flows through the first radiating arm 921, the second radiating arm 922, and the second ground arm 925, the electric current is further coupled to the first ground arm 924, thereby exciting a 4G mode to generate a radiation signal in a 4G frequency band.

Figure 9:
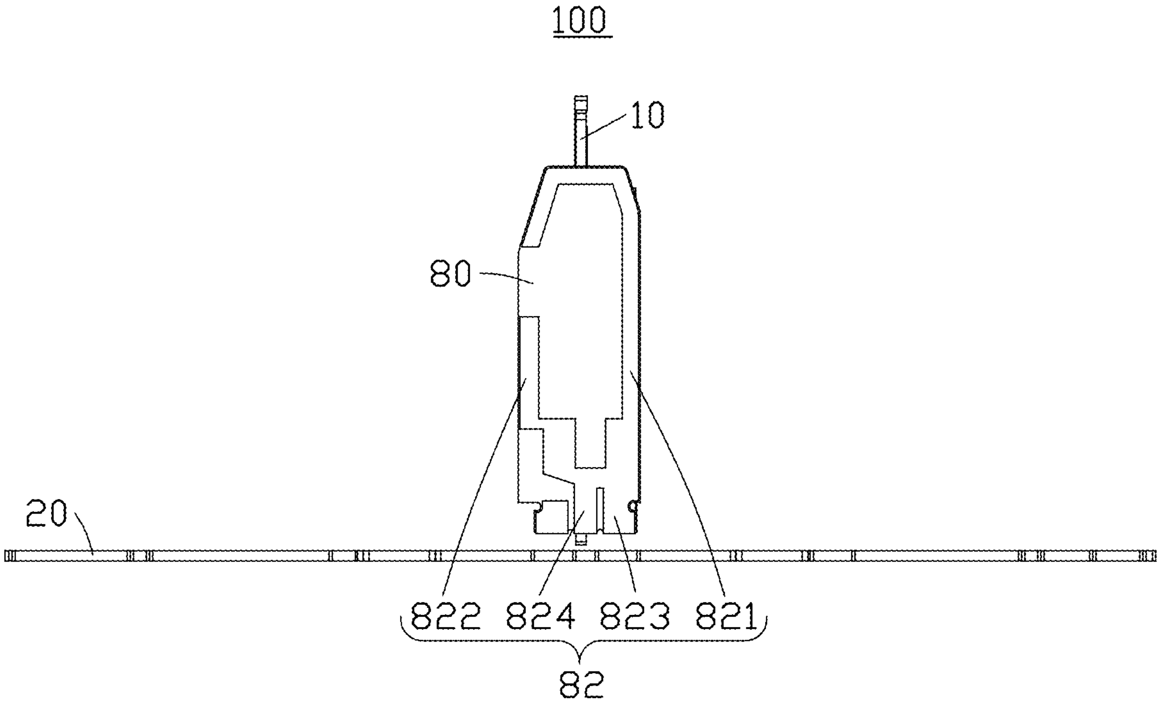
FIG. 9 is a plane diagram of a third circuit board of the antenna module of FIG. 5.

Referring to FIG. 9, the third circuit board 80 arranges with a main radiator 82 of the 4G antenna. The main radiator 82 includes a third radiating arm 821, a fourth radiating arm 822, a feed arm 823, and a third ground arm 824. One end of the feed arm 823 is electrically connected to the electric current feed source of the second circuit board 20 for feeding electric current. The third ground arm 824 is spaced apart from the feed arm 823, one end of the third ground arm 824 is grounded. The third radiating arm 821 is extended along the feed arm 823 and then bent, the third radiating arm 821 is substantially U-shaped. The fourth radiating arm 822 is substantially stepped-shaped, one end of the fourth radiating arm 822 is substantially perpendicular to the feed arm 823, another end of the fourth radiating arm 822 is spaced apart from the third radiating arm 821. Another end of the third radiating arm 821 is further connected to the fourth radiating arm 822.

The feed arm 823 supplies electric current, the electric current flows through the third radiating arm 821, the fourth radiating arm 822, and the third ground arm 824, thereby exciting the 4G mode to generate a radiation signal in the 4G frequency band.

In at least one embodiment, the vice radiator 92 of the 4G antenna arranged on the fourth circuit board 90 may be severed as a diversity antenna of the 4G antenna, the main radiator 82 of the 4G antenna arranged on the third circuit board 80 may be severed as a main antenna of the 4G antenna.

In another embodiment, the vice radiator 92 of the 4G antenna arranged on the fourth circuit board 90 may be severed as a main antenna of the 4G antenna, the main radiator 82 of the 4G antenna arranged on the third circuit board 80 may be severed as a diversity antenna of the 4G antenna.

Referring to FIG. 5, the antenna module 100 further includes a carrier 110. The carrier 110 is arranged on the second circuit board 20. The first circuit board 10, the third circuit board 80, and the fourth circuit board 90 may be secured to the second circuit board 20 through the carrier 110. In at least one embodiment, the carrier 110 may define a plurality of slots for securing the first circuit board 10, the third circuit board 80, and the fourth circuit board 90. The carrier 110 may be made of non-conductive materials.

The fourth radiating section 44 supplies electric current from the electric current feed source of the second circuit board 20 through the first feed point 62, the fourth radiating section 44 and the third radiating section 42 conduct the electric current, the electric current is further coupled to the radiation cover 30, thereby forming a first electric current conducting path. When the antenna module 100 is powered on, the radiation cover 30 may receive and conduct wireless radiation signals, the third radiating section 42 obtains the wireless radiation signals from the radiation cover 30 by coupling, the third radiating section 42 and the fourth radiating section 44 conduct the wireless radiation signals, and further conduct to the second circuit board 20 through the first feed point 62 and the LNA circuit 70, thereby exciting a first working mode to receive the wireless radiation signals in a first frequency band. In at least one embodiment, the first mode may include a Digital Audio Broadcasting (DAB) mode, the first radiation frequency band may include 178-238 MHz frequencies.

The second radiating section 54 supplies electric current from the electric current feed source of the second circuit board 20 through the second feed point 64, the second radiating section 54, the first radiating section 52, and the connecting portion 56 conduct the electric current, the connecting portion 56 further conducts the electric current to the radiation cover 30, thereby forming a second electric current conducting path. When the antenna module 100 is powered on, the radiation cover 30 may receive and conduct wireless radiation signals, the connecting portion 56 obtains the wireless radiation signals from the radiation cover 30 by conducting, the connecting portion 56, the first radiating section 52, and the second radiating section 54 conduct the wireless radiation signals, and further conduct to the second circuit board 20 through the second feed point 64 and the LNA circuit 70, thereby exciting a second working mode to receive the wireless radiation signals in a second frequency band. In at least one embodiment, the second working mode may include a Frequency Modulation (FM) mode, the second radiation frequency band may include 88-108 MHz frequencies.

The frequencies of the first radiation frequency band (that is the DAB frequency band, 178-238 MHz) is greater than the frequencies of the second radiation frequency band (that is the FM frequency band, 88-108 MHZ).

Figure 10:
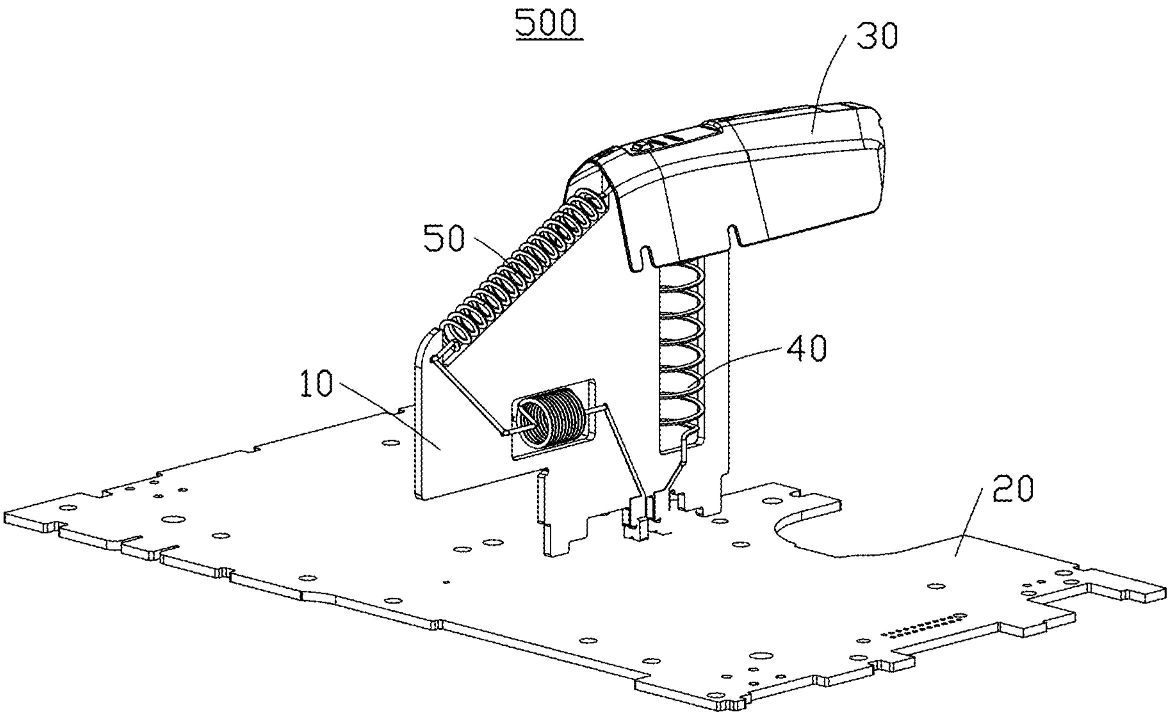
FIG. 10 is a schematic diagram of an antenna module according to a second embodiment of the present application.
Figure 11:
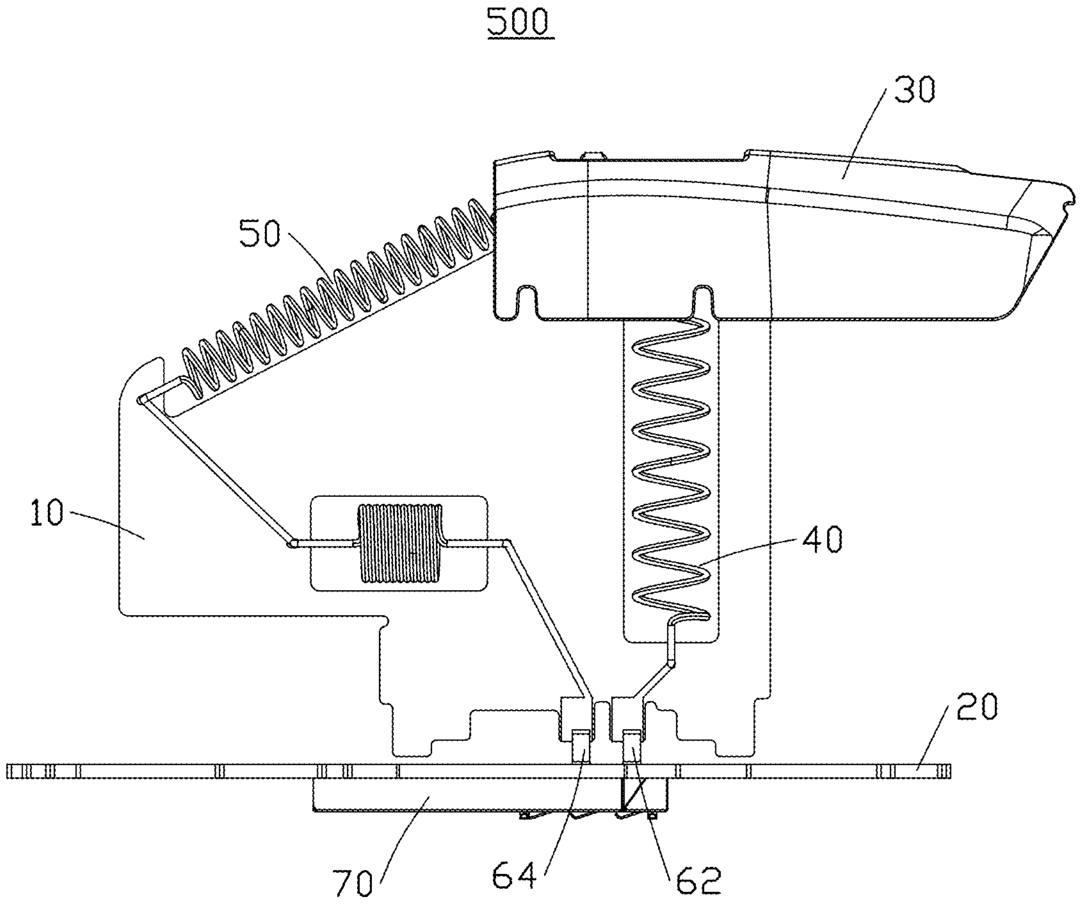
FIG. 11 is a cross-sectional diagram of the antenna module of FIG. 10.
Figure 12:
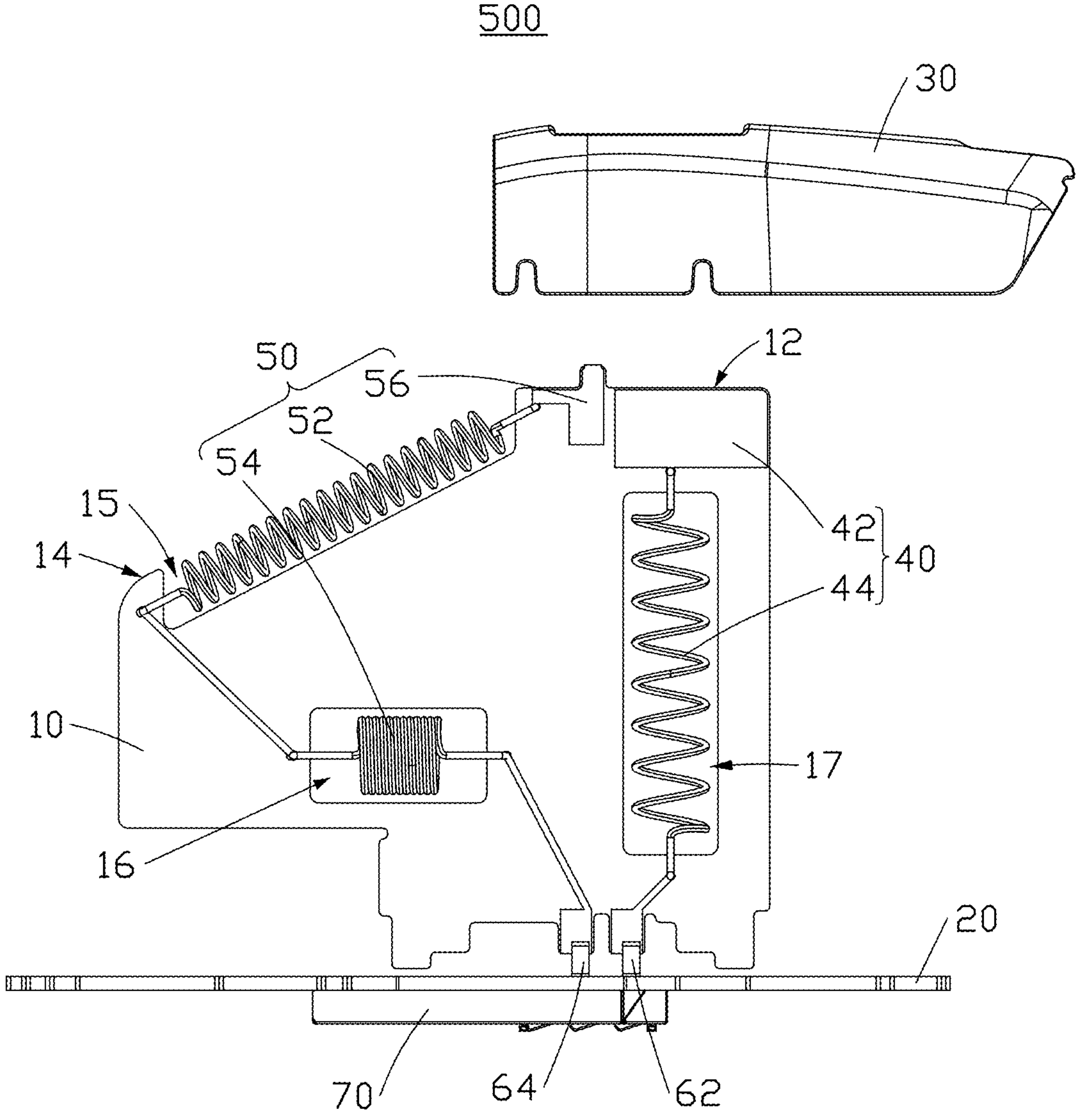
FIG. 12 is an explored cross-sectional diagram of the antenna module of FIG. 11.

Referring to FIGS. 10, 11, and 12, a second embodiment of the present disclosure provides an antenna module 500. The antenna module 500 of the second embodiment and the antenna module 100 of the first embodiment are substantially the same, merely the first radiating portion and the second radiating portion arranged on the first circuit board are different.

In detail, the first circuit board 10 defines a plurality of slots, such as a first slot 15, a second slot 16, and a third slot 17. The first slot 15 is defined along the bevel side of the first circuit board 10, the first radiating section 52 is arranged in the first slot 15. The second slot 16 is substantially parallel with the second circuit board 20, the second radiating section 54 is arranged in the second slot 16. The third slot 17 is substantially perpendicular to second circuit board 20, the fourth radiating section 44 is arranged in the third slot 17. The first radiating section 52, the second radiating section 54, and the fourth radiating section 44 are substantially coil shaped, which are stereochemical structures and arranged in the plurality of slots 15, 16, 17 defined in the first circuit board 10.

In at least one embodiment, the first radiating section 52, the second radiating section 54, and the fourth radiating section 44 can be other forms, such as circuit forms, besides the circuit board printed coils or stereochemical coil shaped. Selectively, the first radiating section 52, the second radiating section 54, and the fourth radiating section 44 may be all circuit board printed coils, all in stereochemical coil shaped, all in circuit forms, or any combination forms selective from the circuit board printed coils, the stereochemical coil shaped, and the circuit forms. In some other embodiment, the first radiating portion 40 and the second radiating portion 50 are printed on at least one surface of the first circuit board 10. In some other embodiment, the first radiating portion 40 and the second radiating portion 50 may be printed on one surface or two surfaces of the first circuit board 10.

Figure 13:
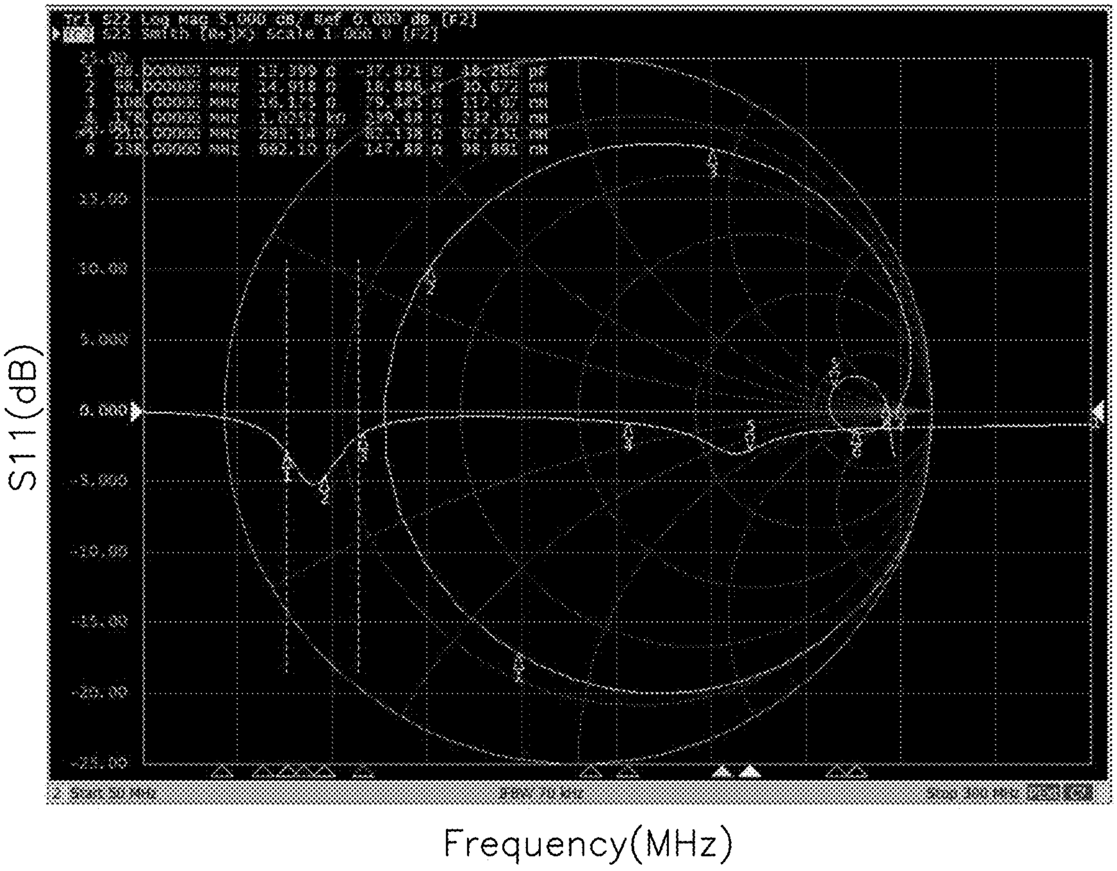
FIG. 13 is a curve graph of S11 parameters when the antenna module operates in a first frequency band.

FIG. 13 is a graph of scattering parameters (S11 parameters) when the antenna modules 100, 500 operates in the first frequency band. Wherein, the curve shown in FIG. 13 shows the antenna modules 100, 500 may achieve great S11 values when operate in the first frequency band (DAB frequency band, 178-238 MHz).

Figure 14:
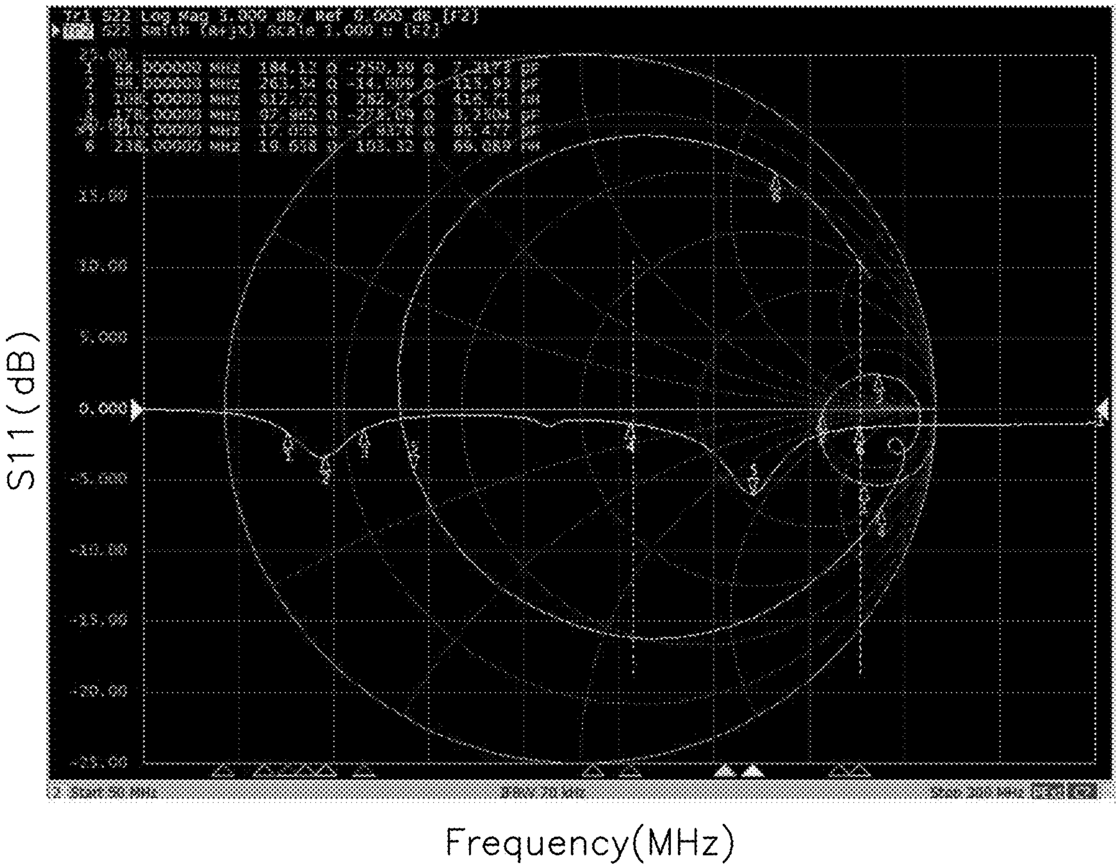
FIG. 14 is a curve graph of S11 parameters when the antenna module operates in a second frequency band.

FIG. 14 is a graph of scattering parameters (S11 parameters) when the antenna modules 100, 500 operates in the second frequency band. Wherein, the curve shown in FIG. 14 shows the antenna modules 100, 500 may achieve great S11 values when operate in the second frequency band (FM frequency band, 88-108 MHZ).

Figure 15:
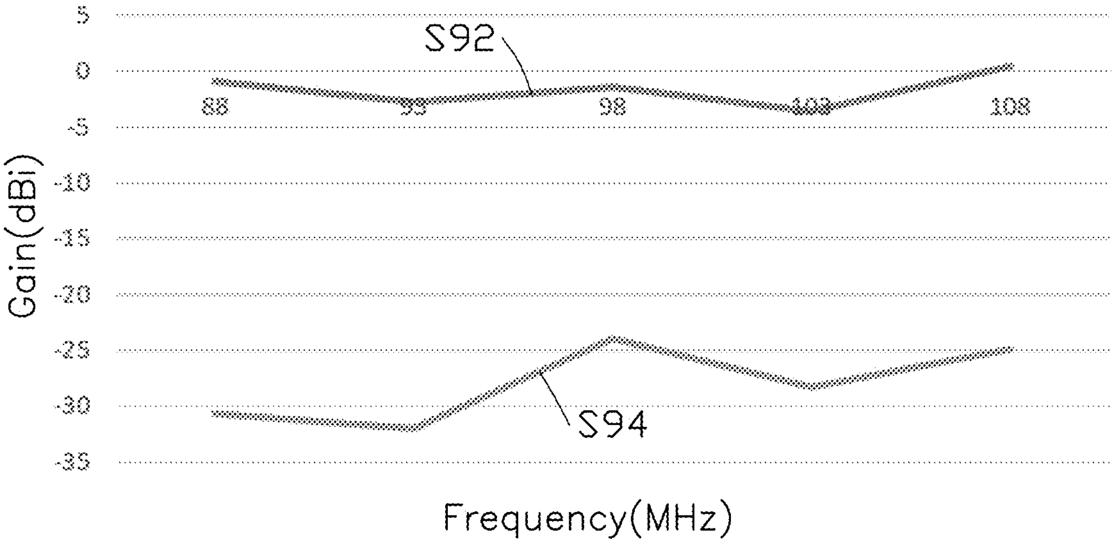
FIG. 15 is a gain diagram when the antenna module operates in the first frequency band.

FIG. 15 is a gain curve graph when the antenna modules 100, 500 operates in the first frequency band. Wherein, a curve S92 is an active antenna gain curve graph when the antenna modules 100, 500 operates in the first frequency band (DAB frequency band, 178-238 MHz), that is, a gain curve graph when the antenna modules 100, 500 including the LNA circuit 70. A curve S94 is a passive antenna gain curve graph when the antenna modules 100, 500 operates in the first frequency band (DAB frequency band, 178-238 MHz), that is, a gain curve graph when the antenna modules 100, 500 excluding the LNA circuit 70.

Figure 16:
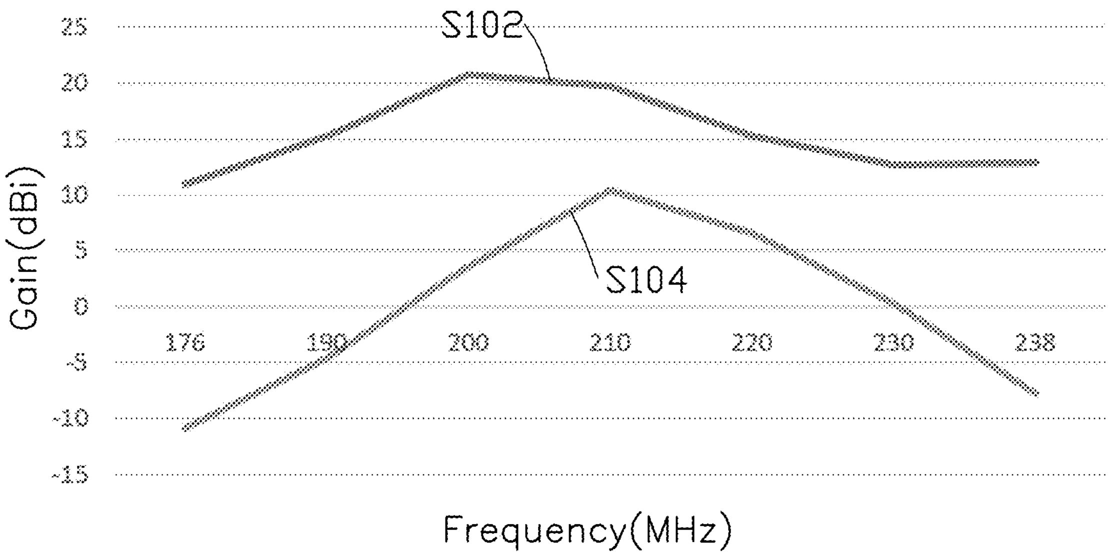
FIG. 16 is a gain diagram when the antenna module operates in the second frequency band.

FIG. 16 is a gain curve graph when the antenna modules 100, 500 operates in the second frequency band. Wherein, a curve S102 is an active antenna gain curve graph when the antenna modules 100, 500 operates in the second frequency band (FM frequency band, 88-108 MHz), that is, a gain curve graph when the antenna modules 100, 500 including the LNA circuit 70. A curve S104 is a passive antenna gain curve graph when the antenna modules 100, 500 operates in the second frequency band (FM frequency band, 88-108 MHZ), that is, a gain curve graph when the antenna modules 100, 500 excluding the LNA circuit 70.

The antenna modules 100, 500 may be applied in the vehicle and sever as car shark fin antennas, through printing or defining slots for arranging the first radiating portion 40 and the second radiating portion 50 on the first circuit board 10, the radiation cover 30 receives wireless radiation signals, and further conducts or couples the wireless radiation signals to the first radiating portion 40 and the second radiating portion 50, and the LNA circuit 70 of the second circuit board 20 provides matching and amplifying for the received wireless radiation signals, so the antenna modules 100, 500 may receive wireless radiation signals of the predetermined frequency bands (such as the DAB frequency band and the FM frequency band), and have a great antenna performance and gain.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. An antenna module applied in a vehicle, the antenna module comprising:

a first circuit board and a second circuit board, a surface of the first circuit board being perpendicular to a surface of the second circuit board;

a radiation cover, the radiation cover covering one part of an end of the first circuit board and one part of two opposite surfaces of the first circuit board;

a first radiating portion, the first radiating portion arranged on the first circuit board and perpendicular to the second circuit board, the first radiating portion configured to receive wireless radiation signals in a first frequency band through the radiation cover;

a second radiating portion, the second radiating portion arranged on the first circuit board, the second radiating portion comprising a first radiating section and a second radiating section connected to the first radiating section in a predetermined angle, the second radiating section being parallel with the second circuit board, the second radiating portion configured to receive wireless radiation signals in a second frequency band through the radiation cover; and a third circuit board and a fourth circuit board, wherein a surface of the third circuit board, the surface of the second circuit board, and the surface of the first circuit board are perpendicular to each other; a surface of the fourth circuit board is parallel with the surface of the first circuit board.

2. The antenna module of claim 1, wherein the first radiating portion comprises a third radiating section and a fourth radiating section connected to each other, the radiation cover covers at least one part of the third radiating section and is spaced apart from the third radiating section, the third radiating section obtains the wireless radiation signals from the radiation cover by coupling, the fourth radiating section is perpendicular to the second circuit board.

3. The antenna module of claim 2, wherein the first radiating portion and the second radiating portion are printed on at least one surface of the first circuit board.

4. The antenna module of claim 2, wherein the first circuit board defines a plurality of slots, the first radiating section, the second radiating section, and the fourth radiating section are arranged in the plurality of slots.

5. The antenna module of claim 2, wherein the first radiating section, the second radiating section, and the fourth radiating section are coil shaped, the third radiating section is rectangular shaped.

6. The antenna module of claim 1, wherein the second radiating portion further comprises a connecting portion, one end of the connecting portion is connected to the radiation cover, another end of the connecting portion is connected to the first radiating section, the connecting portion obtains the wireless radiation signals from the radiation cover and conducts the wireless radiation signals to the first radiating section and the second radiating section.

7. The antenna module of claim 1, wherein the third circuit board comprises a main radiator of a 4G antenna, the fourth circuit board comprises a second radiator of the 4G antenna, the main radiator of the 4G antenna and the second radiator of the 4G antenna are configured to generate radiation signals in a 4G frequency band.

8. The antenna module of claim 1, further comprising a first feed point and a second feed point, wherein the first feed point and the second feed point are arranged on the first circuit board, the first feed point and the second feed point are configured to feed electric currents into the first radiating portion and the second radiating portion.

9. The antenna module of claim 8, further comprising a low noise amplifier (LNA) circuit, wherein the LNA circuit is arranged on a surface of the second circuit board which is away from the first circuit board, the LNA circuit is electrically connected between an electric current feed source of the second circuit board and each of the first feed point and the second feed point.

10. A wireless communication device comprising an antenna module, the antenna module comprising:

a first circuit board and a second circuit board, a surface of the first circuit board being perpendicular to a surface of the second circuit board;

a radiation cover, the radiation cover covering one part of an end of the first circuit board and one part of two opposite surfaces of the first circuit board;

a first radiating portion, the first radiating portion arranged on the first circuit board and perpendicular to the second circuit board, the first radiating portion configured to receive wireless radiation signals in a first frequency band through the radiation cover;

a second radiating portion, the second radiating portion arranged on the first circuit board, the second radiating portion comprising a first radiating section and a second radiating section connected to the first radiating section in a predetermined angle, the second radiating section being parallel with the second circuit board, the second radiating portion configured to receive wireless radiation signals in a second frequency band through the radiation cover; and a third circuit board and a fourth circuit board, wherein a surface of the third circuit board, the surface of the second circuit board, and the surface of the first circuit board are perpendicular to each other; a surface of the fourth circuit board is parallel with the surface of the first circuit board.

11. The wireless communication device of claim 10, wherein the first radiating portion comprises a third radiating section and a fourth radiating section connected to each other, the radiation cover covers at least one part of the third radiating section and is spaced apart from the third radiating section, the third radiating section obtains the wireless radiation signals from the radiation cover by coupling, the fourth radiating section is perpendicular to the second circuit board.

12. The wireless communication device of claim 11, wherein the first radiating portion and the second radiating portion are printed on at least one surface of the first circuit board.

13. The wireless communication device of claim 11, wherein the first circuit board defines a plurality of slots, the first radiating section, the second radiating section, and the fourth radiating section are arranged in the plurality of slots.

14. The wireless communication device of claim 11, wherein the first radiating section, the second radiating section, and the fourth radiating section are coil shaped, the third radiating section is rectangular shaped.

15. The wireless communication device of claim 10, wherein the second radiating portion further comprises a connecting portion, one end of the connecting portion is connected to the radiation cover, another end of the connecting portion is connected to the first radiating section, the connecting portion obtains the wireless radiation signals from the radiation cover and conducts the wireless radiation signals to the first radiating section and the second radiating section.

16. The wireless communication device of claim 10, wherein the third circuit board comprises a main radiator of a 4G antenna, the fourth circuit board comprises a second radiator of the 4G antenna, the main radiator of the 4G antenna and the second radiator of the 4G antenna are configured to generate radiation signals in a 4G frequency band.

17. The wireless communication device of claim 10, wherein the antenna module further comprises a first feed point and a second feed point, wherein the first feed point and the second feed point are arranged on the first circuit board, the first feed point and the second feed point are configured to feed electric currents into the first radiating portion and the second radiating portion.

18. The wireless communication device of claim 17, the antenna module further comprises a low noise amplifier (LNA) circuit, wherein the LNA circuit is arranged on a surface of the second circuit board which is away from the first circuit board, the LNA circuit is electrically connected between an electric current feed source of the second circuit board and each of the first feed point and the second feed point.

* * * * *